United States Patent

Reynolds et al.

[11] Patent Number: 5,179,866
[45] Date of Patent: Jan. 19, 1993

[54] TRANSMISSION GEAR RETAINER

[75] Inventors: Joseph D. Reynolds, Climax; Alan C. Stine, Kalamazoo, both of Mich.

[73] Assignee: Eaton Corporation, Cleveland, Ohio

[21] Appl. No.: 790,973

[22] Filed: Nov. 12, 1991

[51] Int. Cl.⁵ .............................. F16H 3/08
[52] U.S. Cl. ....................... 74/332; 74/331; 192/67 R
[58] Field of Search ............... 74/331, 333, 363, 410, 74/412 R, 438; 192/48.91, 67 R

[56] References Cited

U.S. PATENT DOCUMENTS

| | | | |
|---|---|---|---|
| 2,397,905 | 4/1946 | Acton et al. | 303/135 |
| 3,237,472 | 3/1966 | Perkins et al. | 74/331 |
| 3,425,290 | 2/1969 | Perkins | 74/331 |
| 3,611,823 | 10/1971 | Richards et al. | 192/67 R X |
| 3,648,546 | 3/1972 | McNamara et al. | 74/363 X |
| 3,894,621 | 7/1975 | Quick | 192/109 R |
| 4,034,620 | 7/1977 | McNamara et al. | 74/410 |
| 4,104,928 | 8/1978 | Vanderwoort | 74/331 |
| 4,423,643 | 1/1984 | McNamara | 74/331 |
| 4,485,686 | 12/1984 | Olmstead, Jr. et al. | 74/331 |
| 4,949,589 | 8/1990 | Reynolds | 74/363 |
| 5,062,313 | 11/1991 | Fletcher | 74/333 X |

Primary Examiner—Leslie A. Braun
Assistant Examiner—Khoi Q. Ta
Attorney, Agent, or Firm—A. E. Chrow

[57] ABSTRACT

A gear retainer (200) is provided that features a thrust washer (54) that is secured in a transverse groove (40) in a transmission mainshaft (3) for rotation therewith and extends outwardly therefrom into a groove defined between a radially outwardly extending second surface (50) and a retainer ring (58) disposed in a slot (47) in an axially extending first surface (46) defining a recess (42) in a floating mainshaft gear (20 encircling mainshaft (3). Gear retainer (200) is operative to limit axial movement of gear (20) and to transmit axial thrust to mainshaft (3) that may have been imparted thereto by a clutching mechanism (24) during the process of clutching gear (20) to mainshaft (3). In another embodiment a gear retainer (300) is provided that includes a spacer (62) between ring (58) and thrust washer (54) that is secured for rotation with gear (20) and is operative to increase contact surface area between ring (58) and thrust washer (54).

5 Claims, 3 Drawing Sheets

TRANSMISSION GEAR RETAINER

INTRODUCTION

This invention relates generally to an improved gear retainer for use in connection with a transmission having at least one floating mainshaft gear and, more particularly, to an improved gear retainer for limiting axial movement of the mainshaft gear in opposite axial directions and to transfer axial thrust to the mainshaft imparted thereto during the process of clutching the gear to the mainshaft.

BACKGROUND OF THE INVENTION

Transmissions featuring floating transmission mainshaft gears such as associated with twin countershaft transmissions are well known and examples of which can be found in U.S. Pat. Nos. 3,237,472; 3,238,613; 3,425,290; and 3,885,446, the disclosures of which are incorporated herein by reference.

Such transmissions generally feature a plurality of floating mainshaft gears that encircle the mainshaft and are supported and driven by countershaft gears, typically countershaft gears, that are respectively mounted on a pair of countershafts disposed on opposite sides of the mainshaft.

The mainshaft gears are characteristically clutched to the mainshaft by means of a clutch mechanism that slides along external splines extending axially along the mainshaft and has radially inwardly extending teeth or splines that engage internal teeth or splines on the mainshaft gear so as to cause rotation of the mainshaft when the mainshaft gear is clutched thereto.

A problem long ago recognized has been the potential transfer of axial thrust to a mainshaft gear being clutched to the mainshaft causing it to move axially which is of particular concern in view of mainshaft gears that are in close proximity to each other. In view of such, a variety of solutions have been devised over past years for the transmitting axial thrust imparted by an axially moving clutch to the mainshaft rather than to the gear being clutched to the mainshaft.

Such solutions have generally been in the form of gear retainer(s) of one type or another that characteristically limit axial movement of the mainshaft gear of which one example is disclosed in U.S. Pat. No. 2,397,905, the disclosure of which is incorporated herein by reference. Here however, a costly and expensive pivotal Woodruff key is required to lock a thrust collar onto external splines of the mainshaft to prevent a gear from moving axially.

An example of a splined thrust washer for transmitting axial thrust from a gear set to a propeller drive shaft is disclosed in U.S. Pat. No. 3,894,621, the disclosure of which is incorporated herein by reference. Here, a splined thrust washer (52) is slid axially along the shaft splines to a transverse groove adjacent a stepped shoulder on the shaft and is held in place against the shoulder by a splined collar (30). Thrust washer (52) is operative to transmit axial thrust of only one gear to the propeller shaft and, in addition to requiring the use of collar (30), also requires costly and complex machining of a stepped configuration to the propeller shaft exterior.

Another example of a transmission mainshaft gear retainer for preventing axial movement of two closely spaced gears to prevent transfer of axial thrust force therebetween is disclosed in U.S. Pat. No. 4,034,620, the disclosure of which is incorporated herein by reference. Here a thrust ring (104) is splined to the mainshaft between two adjacent gears and is held in place by means of snap rings (108, 110) on opposite sides thereof. The gears are further required to have costly and complex mating tongue and groove configurations that operate in conjunction with an additional snap ring (102) to limit movement of the gears away from each other.

Another example of thrust devices for use in transmitting thrust from a floating mainshaft gear being clutched to a mainshaft is described in U.S. Pat. No. 4,104,928, the disclosure of which is incorporated herein by reference. However, it is not clear precisely what construction is used to prevent closely adjacent gears from contacting each other during the clutching process.

Yet another example of a gear retainer for preventing closely adjacent mainshaft gears from contacting each other while one is being clutched to the mainshaft is described in U.S. Pat. No. 4,485,686, the disclosure of which is incorporated herein by reference. Here, however, two snap rings (82) and (96) are required in addition to having to provide the inner periphery of thrust plates (86) and (92) with splines (86) and (98) respectively in order to enable the mainshaft to rotate the thrust plates while holding them against a common spacer (90) located between the two thrust plates.

A somewhat similar thrust plate arrangement to that disclosed in above described U.S. Pat. No. 4,485,686 is described in U.S. Pat. No. 4,423,643.

A more recent example of a three thrust plate arrangement in conjunction with providing closely adjacent mainshaft gears (30) and (32) with flanges having thrust surfaces on opposite sides is disclosed in U.S. Pat. No. 4,949,589 owned by the assignee of the present invention and the disclosure of which is incorporated herein by reference.

Although the above described thrust plate or gear retainer arrangements may be effective, they heretofore have been characteristically complex in their construction and number of parts creating a need to provide a simpler means for transmitting axial thrust to a mainshaft imparted by a clutch to a floating mainshaft gear being clutched to the mainshaft.

SUMMARY OF THE INVENTION

Accordingly, it is an object of this invention to provide a gear retainer for limiting axial movement of a transmission floating mainshaft gear and to transmit axial thrust to the mainshaft that has been imparted to the mainshaft gear during the process of clutching the gear to the mainshaft.

It is another object of this invention to provide a simple and inexpensive gear retainer that effectively limits axial movement of a floating mainshaft gear and to transmit axial thrust to the mainshaft imparted thereto by a clutching mechanism during the process of clutching the gear to the mainshaft.

DESCRIPTION OF SOME PREFERRED EMBODIMENTS

Figure 1:
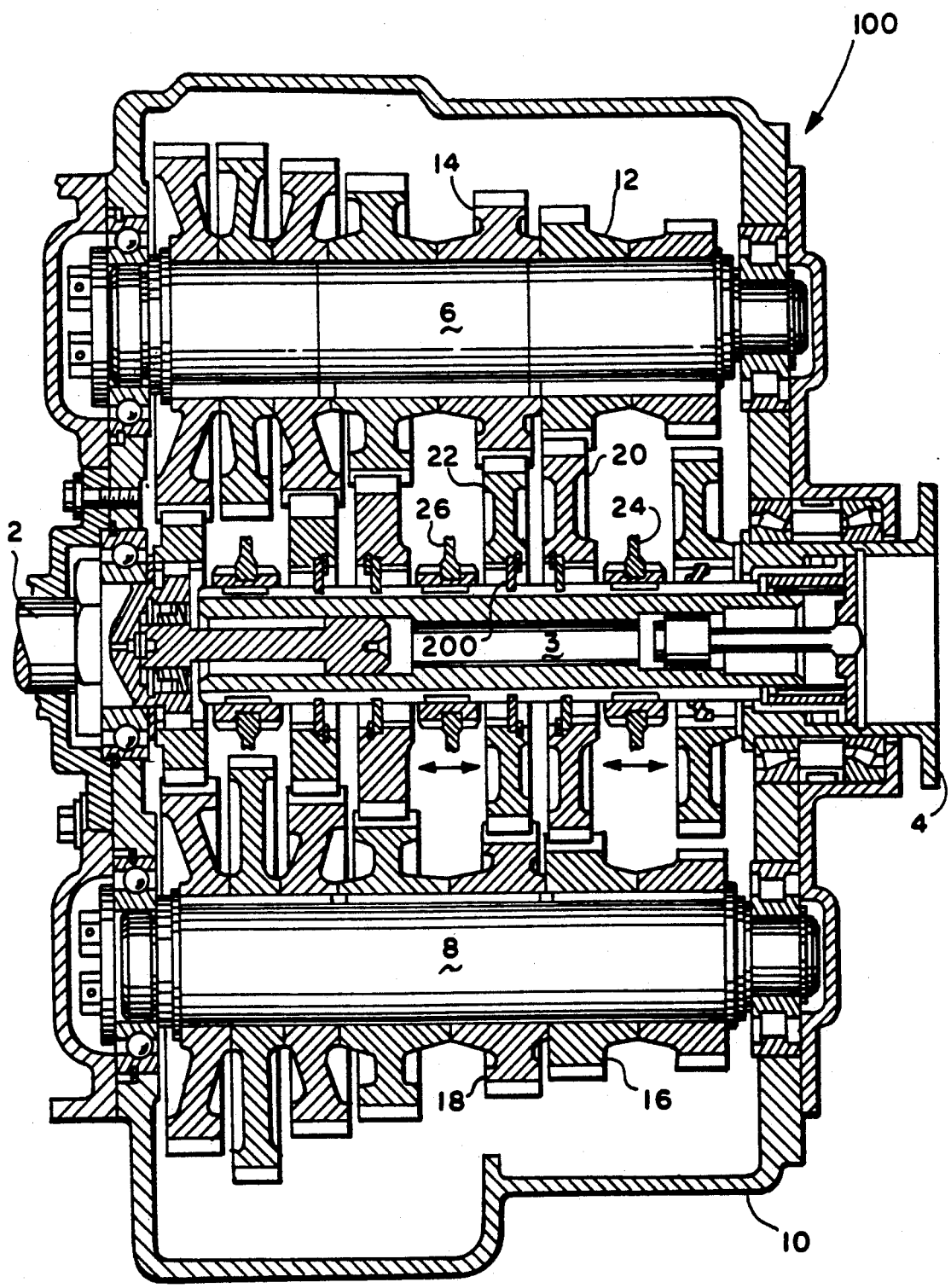
FIG. 1 is a central cross-sectional view of a motor vehicle transmission 100 utilizing a gear retainer 200 of the invention shown in FIG. 2.

Transmission 100 in FIG. 1 is a multishaft transmission having a mainshaft 3 that although may be of solid construction is in many instances made hollow as shown to lessen weight.

Disposed in substantially parallel relationship on opposite sides of mainshaft 3 are countershafts 6 and 8. Mainshaft 3 and countershafts 6 and 8 are journaled for rotation on housing 10 of transmission 100. Countershaft 6 carries countershaft gears such as referenced by numerals 12 and 14 and countershaft 8 carries countershaft gears such as referenced by numerals 16 and 18.

Input shaft 2 is driven by the vehicle's engine and is operably connected to countershafts 6 and 8 and causes them to rotate in response to its own rotation which in turn causes the previously described countershaft gears to rotate.

Mainshaft 3 is encircled by floating mainshaft gears such as referenced by numerals 20 and 22 with gear 20 having teeth that meshingly engage with the teeth of countershaft gears 12 and 16 and thus is rotatively supported thereby. Likewise, the teeth on mainshaft gear 22 engage the teeth on countershaft gears 14 and 18 and is rotationally supported thereby.

Figure 2:
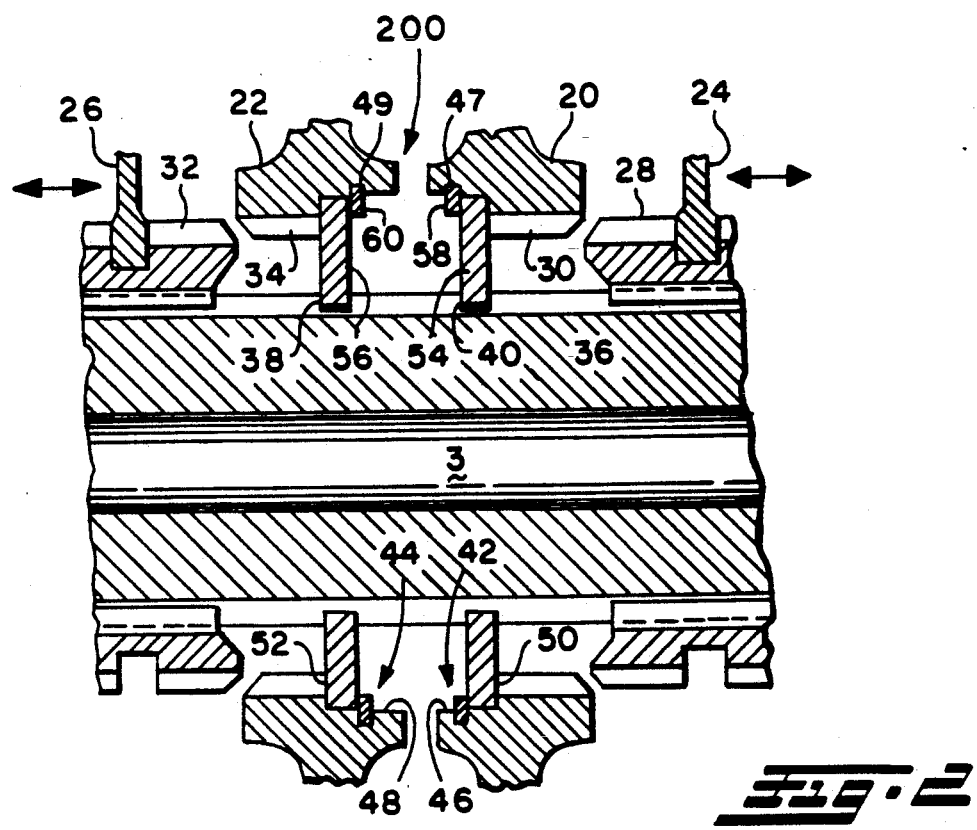
FIG. 2 is a partial central cross-sectional view of a gear retainer 200 of the invention.
Figure 3:
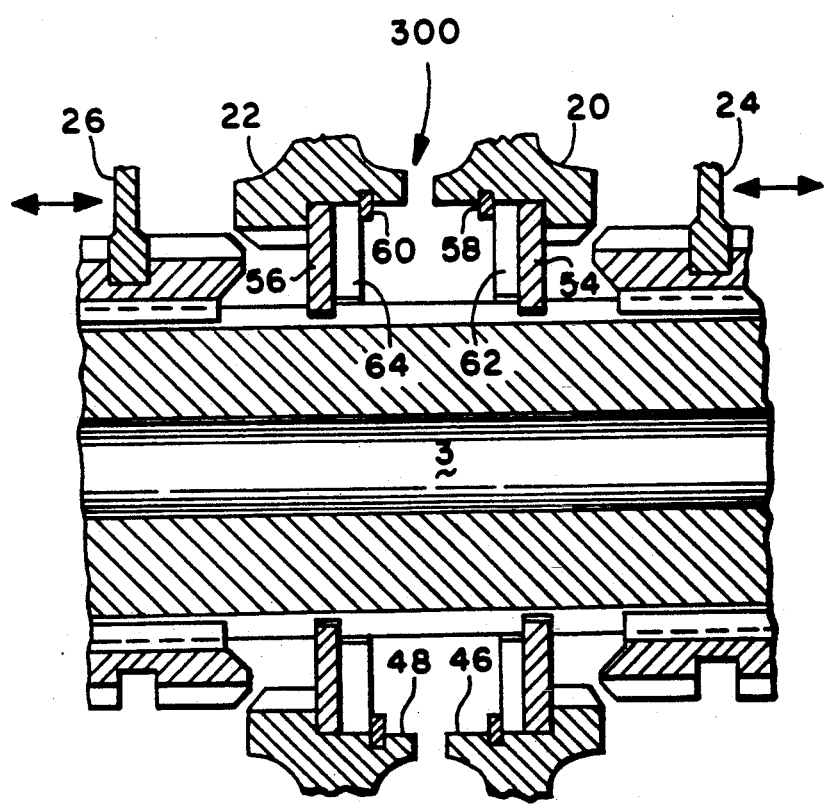
FIG. 3 is a partial central cross-sectional view of a gear retainer 300 of the invention.

Mainshaft gears 20 and 22 rotate freely about mainshaft 3 until clutched thereto by clutch mechanisms 24 and 26 respectively that are operative to move in opposite axial directions as shown by the arrows and the operation of which is more fully described herein with respect to FIGS. 2 and 3.

When either of mainshaft gears 20 and 22 is clutched to mainshaft 3, it is caused to rotate at an RPM determined by the particular gear ratio provided by the countershaft gear and mainshaft gear involved. Rotation of mainshaft 3 causes output shaft 4 to rotate which in turn is operatively connected to the vehicle's wheels by means of a drive shaft or other form of connection.

The axial movement of clutch mechanism 24 and 26 imparts on axial thrust against gears 20 and 22 respectively that, in the absence of a gear retainer, might cause the gear being clutched to move axially resulting in undue wear the teeth of either or both the mainshaft and countershaft gears and might even cause the gears being clutched to the mainshaft to move axially a distance sufficient to cause it to contact the side of the mainshaft gear adjacent hereto when the gears are in close proximity to each other.

In order to limit such axial movement of the mainshaft gear being clutched to the mainshaft and to transmit the axial thrust to the mainshaft created during the clutching process, transmission 100 is provided with gear retainers 200 described herein in greater detail with respect to FIG. 2.

The outer surface of mainshaft 3 in FIG. 2 has axially extending splines 36 along which clutch mechanisms 24 and 26 selectively slide in opposite directions as shown by the arrows. Teeth 28 of clutch mechanism 24 are operative to meshingly engage teeth 30 of mainshaft 20 when clutch mechanism 24 moves towards the viewer's left and clutch mechanism 26 has teeth 32 that are operative to engage teeth 34 on mainshaft gear 22 when clutch mechanism 26 moves towards the viewer's right.

Mainshaft gears 20 and 22 are respectively provided with annular pockets or recesses 42 and 44 in the respective sides thereof that are in adjacent relationship to each other and extend to the outer periphery of gears 20 and 22 respectively. Recess 42 has a first surface 46 that extends axially for a predetermined distance in facing relationship to mainshaft 3. Likewise, mainshaft gear 22 has a first surface 48 that extends axially for a predetermined distance in facing relationship to mainshaft 3.

Surface 46 is intersected by second surface 50 that extends radially outwardly to the outer periphery of gear 20 in substantially orthogonal relationship to surface 46. Likewise, surface 48 is intersected by second surface 52 that extends radially outwardly to the outer periphery of gear 22 in substantial orthogonal relationship to surface 48. As such, surfaces 50 and 52 face axially towards each other.

The outer surface of mainshaft 3 is provided with a pair of axially spaced-apart transverse annular grooves 38 and 40. Groove 40 is in substantial registration with recess 42 and has an edge, not referenced, facing towards groove 38 that is substantially parallel with surface 50. Likewise, groove 38 is in substantial registration with recess 44 with an edge facing towards groove 40 that is substantially axially aligned with surface 52.

Thrust washer 54 is disposed in annular groove 46 and extends outwardly therefrom into recess 42 and ends in a predetermined clearance relationship from surface 46. Thrust washer 54 is secured to mainshaft 3 by suitable means such by key 72 shown in FIG. 4.

Surface 46 includes an annular slot 47 therein an axial distance from surface 50 predetermined to enable thrust washer 54 to fit within recess 46 therebetween. A removable securement ring 58 is disposed in slot 47 and extends into recess 46 for a distance sufficient to define a groove between ring 58 and surface 50 within recess 46 in which thrust washer 54 is received and which is substantially axially aligned with groove 40 in mainshaft 3 and enables thrust washer 54 to limit axial movement of gear 20 in either direction while rotating with mainshaft 3 independently of gear 20 except for sliding rotational engagement with ring 58 or with surface 50 as the case may be.

Similarly, the edge of groove 38 facing towards groove 40 is substantially axially aligned with surface 52. Surface 48 includes an annular slot 49 a predetermined axial distance from surface 52 such that when retainer ring 60 is disposed therein, a groove is defined within recess 44 that is substantially axially aligned with groove 38 in which thrust washer 56 is secured and extends therefrom into the groove defined between ring 60 and surface 56 and ends in predetermined clearance from surface 48 enabling thrust washer 56 to rotate with mainshaft 3 independent of gear 22 except for sliding rotational engagement with ring 60 or surface 52 as the case may be.

Thus by the simple combination of a thrust washer and removable retaining ring, such as a snap ring, axial movement of the mainshaft gear is limited in either direction and axial thrust imparted thereto by the clutching mechanism is transferred to the mainshaft.

Another embodiment of gear retaining means of the invention includes a spacer member such as a flat washer that is disposed between the retaining ring and the thrust washer and is secured to the mainshaft gear. The spacer is provided with predetermined clearance from mainshaft 3 so that it rotates with the mainshaft gear independently of the mainshaft. More specifically, in FIG. 3 spacer member 62 is secured to mainshaft 3 between retaining ring 58 and thrust washer 54 and spacer member 64 is secured to mainshaft 3 between retaining ring 60 and thrust washer 56. The use of such spacer members increases the surface contact area between the thrust washer and the retaining ring over that provided by the area of the sides of the retainer ring that would contact the thrust washer in the absence of the spacer member. A preferred way of securing the spacer ring to the mainshaft gear is hereinafter described with respect to FIG. 5.

Figure 4:
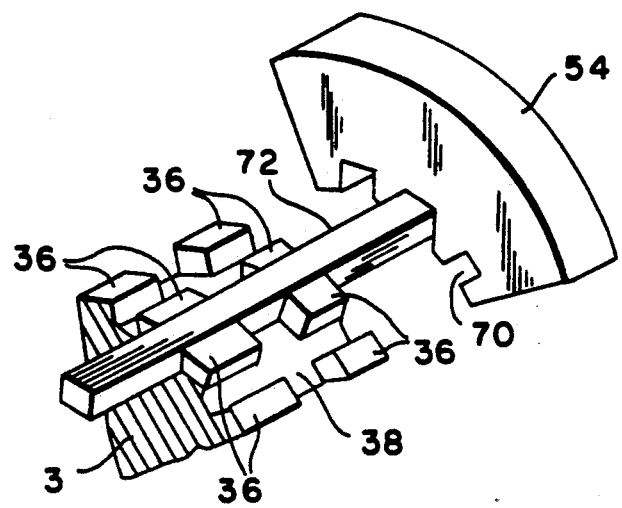
FIG. 4 is a partial perspective view showing a key 22 securing thrust washer 54 to mainshaft 3 shown in FIG. 2.

FIG. 4 illustrates a preferred way of securing thrust washer 54 to mainshaft 3 in which shaft 3 includes a plurality of circumferentially spaced-apart splines 36 intersected by transverse annular grooves 36. Thrust washer 54 has a plurality of circumferentially spaced-apart grooves 70 at the inner periphery that are registerable with splines 36 such that thrust washer 54 can be slid axially along splines 36 on mainshaft 3 to transverse grooves 38 and then rotated until grooves 70 align with the un-referenced grooves between splines 36 to define a keyway into which key 72 is received to secure thrust washer 54 to mainshaft 3.

Figure 5:
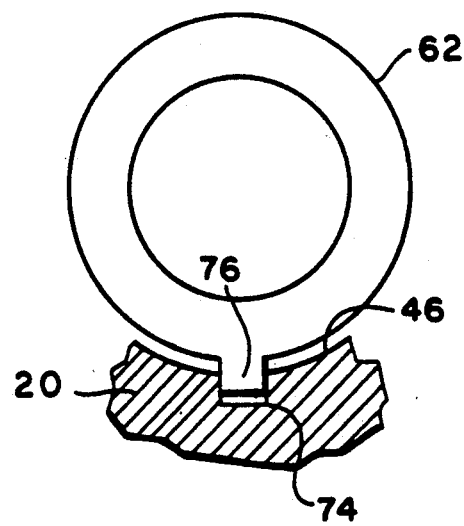
FIG. 5 is a partial cross-sectional view showing how spacer 62 is secured to mainshaft gear 22 shown in FIG. 3.

FIG. 5 illustrates a preferred way by which spacer member 62 of FIG. 3 is secured to mainshaft gear 20 by providing an axially extending slot or keyway 74 in surface 46 and spacer 62 is provided with a protuberance or tab 76 that is adapted to be received into slot 74 to cause spacer member 62 to rotate in unison with mainshaft gear 20.

We claim:

1. In a transmission of the type having a mainshaft, at least one floating mainshaft gear encircling said mainshaft, at least two countershafts respectively disposed on opposite sides of the mainshaft in substantial parallel relationship thereto, said countershafts having respective countershaft gears supporting and rotatively driving the mainshaft gear therebetween, clutch means selectively operative to clutch the mainshaft gear to the mainshaft, and improved gear retaining means operative to limit axial movement of the mainshaft gear and to transmit axial thrust to the mainshaft imparted thereto when the mainshaft gear is clutched to the mainshaft by the clutch means, wherein said gear having an annular recess defined by a first surface that extends from a side thereof in substantially parallel facing relationship to the mainshaft and intersects a second substantially orthogonal surface that extends therefrom towards the mainshaft to the outer periphery of the gear, a transverse annular groove in the mainshaft outer surface, said groove having an edge that faces in the same axial direction as the second surface and is in substantial axial alignment therewith, a thrust washer having an inner periphery disposed in the mainshaft groove and secured to the mainshaft for rotation therewith, said thrust washer extending outwardly from the mainshaft groove into the recess in substantial registration therewith and ending to provide a clearance from the first surface sufficient to enable the gear to rotate relative mainshaft and to prevent contact therebetween, a slot disposed in the recess first surface an axial distance from the second surface sufficient to enable the thrust washer to fit therebetween, and a removable retaining ring disposed in the slot and rotatable with the gear, said ring extending into the recess from the first surface for a distance sufficient to define a groove within the recess between the ring and the second surface into which the thrust washer is received that is substantially axially aligned with the mainshaft groove and operative to limit axial movement of the gear and to transmit axial thrust to the mainshaft imparted to the gear when clutched thereto by the clutch means, and a spacer encircling the first surface between the thrust washer and the retaining ring, said spacer secured to the mainshaft gear and rotatable therewith without contacting the mainshaft.

2. The transmission of claim 1 wherein the first surface includes an axially extending slot therein and the spacer is secured to the gear by having a drive tab extending therefrom into the slot.

3. Improved gear retainer means for a transmission of the type having a splined mainshaft, at least one floating mainshaft gear encircling said mainshaft in axial spaced-apart relationship to each other, at least two countershafts respectively disposed on opposite sides of the mainshaft in substantial parallel relationship thereto, said countershafts having respective countershaft gears supporting and rotatively driving the mainshaft gear therebetween, clutch means selectively operative to clutch the mainshaft gear to the mainshaft, and gear retainer means operative to limit axial movement of the mainshaft bear and to transmit axial thrust to the mainshaft imparted thereto by the clutch means, wherein the improvement is characterized by said gear retainer means provided by;

said mainshaft gear having an annular recess defined by a first surface that extends from a side thereof in substantially parallel facing relationship to the mainshaft and intersects a second substantially orthogonal surface that extends therefrom towards the mainshaft to the outer periphery of the gear, a transverse annular groove in the mainshaft outer surface, said groove having an edge that faces in the same axial direction as the second surface and is in substantial axial alignment therewith, a thrust washer having an inner periphery disposed in the groove and secured to the mainshaft for rotation therewith, said thrust washer extending outwardly from the mainshaft groove into the recess in substantial registration therewith and ending to provide a clearance from the first surface sufficient to enable the gear to rotate relative the mainshaft and to prevent contact therebetween, a slot disposed in the recess first surface an axial distance from the second surface sufficient to enable the thrust washer to fit therebetween and a removable retaining ring disposed in the slot and rotatable with the gear, said ring extending into the recess from the first surface for a distance sufficient to define a groove within the recess between the ring and the second surface into which the thrust washer is received that is substantially axially aligned with the mainshaft groove and operative to limit axial movement of the gears and to transmit axial thrust to the mainshaft imparted to the gear when clutched thereto by the clutch means, and a spacer encircling the first surface between the thrust washer and the retaining ring, said spacer secured to the mainshaft gear and rotatable therewith out.contacting the mainshaft.

4. The gear retainer means of claim 3 wherein the mainshaft is a splined mainshaft having a plurality of substantially parallel circumferentially spaced-apart splines separated by grooves extending axially therealong, the thrust washer has a plurality of grooves extending axially therethrough about the inner periphery thereof that are respectively aligned with the mainshaft splines, and the gear is secured to the mainshaft by a key extending through one of the aligned gear and mainshaft grooves.

5. The gear retainer means of claim 4 wherein the first surface includes an axially extending slot therein and the spacer is secured to the gear by having a drive tab extending therefrom into the slot.

* * * * *